US009908589B1

(12) United States Patent
Bailey

(10) Patent No.: US 9,908,589 B1
(45) Date of Patent: Mar. 6, 2018

(54) HULL SHAPE FOR IMPROVED POWERING AND SEAKEEPING

(71) Applicant: Stephen Lee Bailey, Los Gatos, CA (US)

(72) Inventor: Stephen Lee Bailey, Los Gatos, CA (US)

( * ) Notice: Subject to any disclaimer, the term of this patent is extended or adjusted under 35 U.S.C. 154(b) by 0 days.

(21) Appl. No.: 15/139,285

(22) Filed: Apr. 26, 2016

(51) Int. Cl.
    *B63B 39/00* (2006.01)
    *B63B 1/06* (2006.01)
    *B63B 1/08* (2006.01)

(52) U.S. Cl.
    CPC .............. *B63B 1/06* (2013.01); *B63B 1/08* (2013.01); *B63B 39/00* (2013.01); *B63B 2241/06* (2013.01)

(58) Field of Classification Search
    CPC ............. B63B 39/00; B63B 1/06; B63B 1/08
    USPC ........................................................ 114/28
    See application file for complete search history.

(56) References Cited

U.S. PATENT DOCUMENTS

| | | |
|---|---|---|
| 3,180,299 A | 4/1965 | Inui |
| 3,302,603 A | 2/1967 | Eckert |
| 3,306,243 A | 2/1967 | Gray |
| 3,306,244 A | 2/1967 | Schneekluth |
| 3,362,369 A | 1/1968 | Taniguchi |
| 3,443,544 A | 5/1969 | Begizov |
| 3,455,262 A | 7/1969 | Weicker |
| 3,511,203 A | 5/1970 | Buyscoll |
| 3,653,352 A | 4/1972 | Tomiyama |
| 3,946,687 A | 3/1976 | Taylor |
| 4,359,010 A | 11/1982 | Inui |
| 5,269,245 A | 12/1993 | Bystedt |
| 5,280,761 A | 1/1994 | Karafiath |
| 5,787,828 A * | 8/1998 | Barbier .................... B63B 1/107 114/274 |
| 8,875,644 B2 | 11/2014 | Tvete |
| 2014/0196655 A1 * | 7/2014 | Jansen ..................... B63B 1/063 114/290 |

FOREIGN PATENT DOCUMENTS

| | | |
|---|---|---|
| EP | 0497748 A1 | 5/1992 |
| EP | 0807051 A2 | 11/1997 |

OTHER PUBLICATIONS

Kracht, Alfred M., "Design of Bulbous Bows", The Society of Naval Architects and Marine Engineers Transactions, vol. 86 (1978) pp. 197-217.

* cited by examiner

*Primary Examiner* — Stephen Avila

(57) ABSTRACT

A novel hull form is described consisting of a base hull that incorporates flared sides along a bow, middle, and stern sections with raked bow and stern stem lines. The bow and stern sections have lateral oriented shapes, either as an attachment or integral to the hull, spanning the hull beam. The cross sections of these shapes have a novel and specific geometric relationship in conjunction with the base hull to provide a constant cross sectional area between the forward and aft perpendiculars. The shape improves the powering and seakeeping of the vessel hull in the marine environment.

1 Claim, 3 Drawing Sheets

HULL SHAPE FOR IMPROVED POWERING AND SEAKEEPING

CROSS-REFERENCE TO RELATED APPLICATIONS

None.

FEDERALLY SPONSORED RESEARCH

None.

SEQUENCE LISTING

None.

BACKGROUND

Prior Art

The following is a tabulation of some prior art that presently appears relevant:

United States Patents

| Patent Number | Issue Date | Patentee |
|---|---|---|
| 3,180,299 | Apr, 27, 1965 | Inui |
| 3,302,603 | Feb. 7, 1967 | Eckert |
| 3,306,243 | Feb. 28, 1967 | Gray |
| 3,306,244 | Feb. 28, 1967 | Schneekluth |
| 3,362,369 | Jan. 9, 1968 | Taniguchi |
| 3,443,544 | May 13, 1969 | Begizov |
| 3,455,262 | Jul. 15, 1969 | Weicker |
| 3,511,203 | May 12, 1970 | Buyscoll |
| 3,653,352 | Apr. 4, 1972 | Tomiyama |
| 3,946,687 | Mar. 30, 1976 | Taylor |
| 4,359,010 | Nov. 16, 1982 | Inui |
| 5,269,245 | Nov. 14, 1993 | Bystedt |
| 5,280,761 | Jan. 25, 1994 | Karafiath |
| 8,875,644 B2 | Nov, 4, 2014 | Tvete |
| Foreign Patents | | |
| EP 497,748 A1 | May 8, 1992 | Bystedt |
| EP 807,051 B1 | Nov. 19, 1997 | Knudsen |

Kracht, Alfred M. "Design of Bulbous Bows," The Society of Naval Architects and Marine Engineers, Transactions, vol. 86 (1978), pp. 197-217.

BACKGROUND OF INVENTION

The shape of a floating hull below the design waterline has a great impact on the vessel performance in the marine environment. This importance is evident in the prior art through the quantity of research focused on hull shaping particularly with respect to bow and stern bulbs. Within this body of marine research it is generally accepted that the wavemaking resistance of a body passing through a fluid is reduced if the cross sectional area of the body monotonically increases to its maximum from its leading end, remains constant along the body to the maximum extent possible, and then monotonically decreases back to its minimum at the trailing end. A similar phenomena was first discovered in the 1940s and 1950s in the field of aeronautics with respect to the drag of an aircraft in the trans-sonic flow region and was given the term "area rule". The fuselage of an aircraft was necked down in the region of wing attachment to offset the added projected area of the wing. A similar phenomena is true also for the marine hull exposed to water flow. However, due to the air-sea interface of the vessel operating environment, the reduction in resistance will also be maximized if the leading and trailing ends of the underwater hull are submerged to the maximum draft possible below from the free surface in order to minimize wavemaking at the air-water boundary. This patent formulates a hull geometry that invokes the guidance provided by these rules with respect to the resistance of a vessel underway.

The response of a vessel to a seaway is similar to a damped spring-mass system and the motion can be reduced if the damping of the system can be increased. Eddy making damping can be induced through the incorporation of exposed edges transverse to the direction of the body motion in the fluid. An example of this implementation is the addition of bilge keels to a hull. In automotive design it may be found in the slotted piston of the hydraulic shock damper. Viscous damping for a submerged body is also increased through the incorporation of horizontal projected areas of the submerged body. In the offshore oil business, spar buoys integrate both of these features through the suspension of large plate dampers to reduce heave motion. The hull geometry in this patent incorporates these two damping features to reduce the amplitude of vessel motions in a seaway.

DETAILED DESCRIPTION OF THE PREFERRED EMBODIMENT

Figure 1:
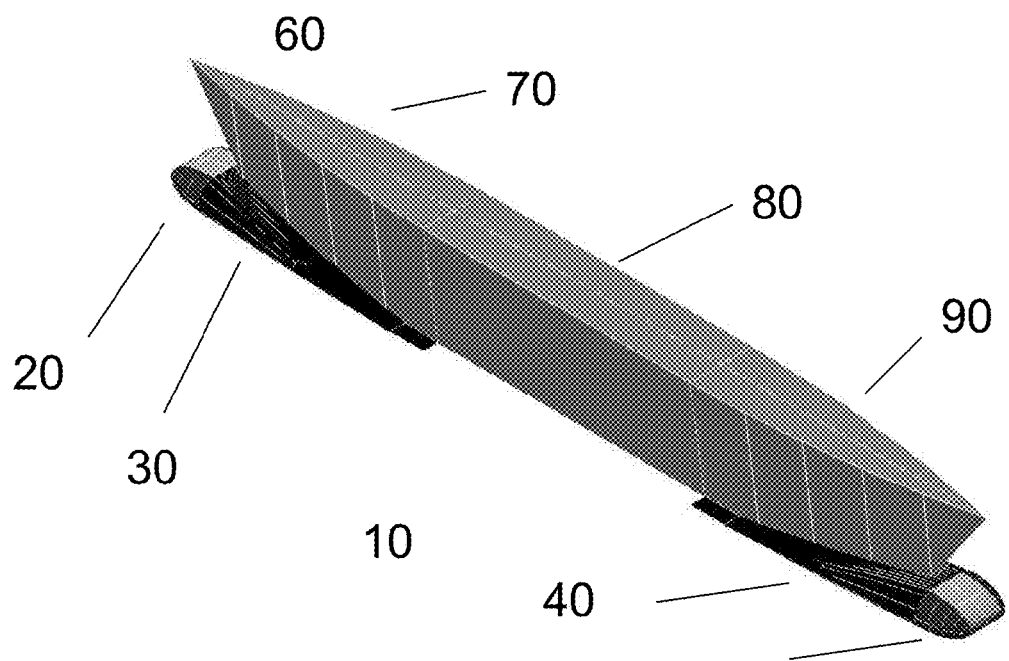
FIG. 1 is an isometric view of the hull with integral or detachable bow and stern shapes that are symmetric fore and aft.
Figure 2:
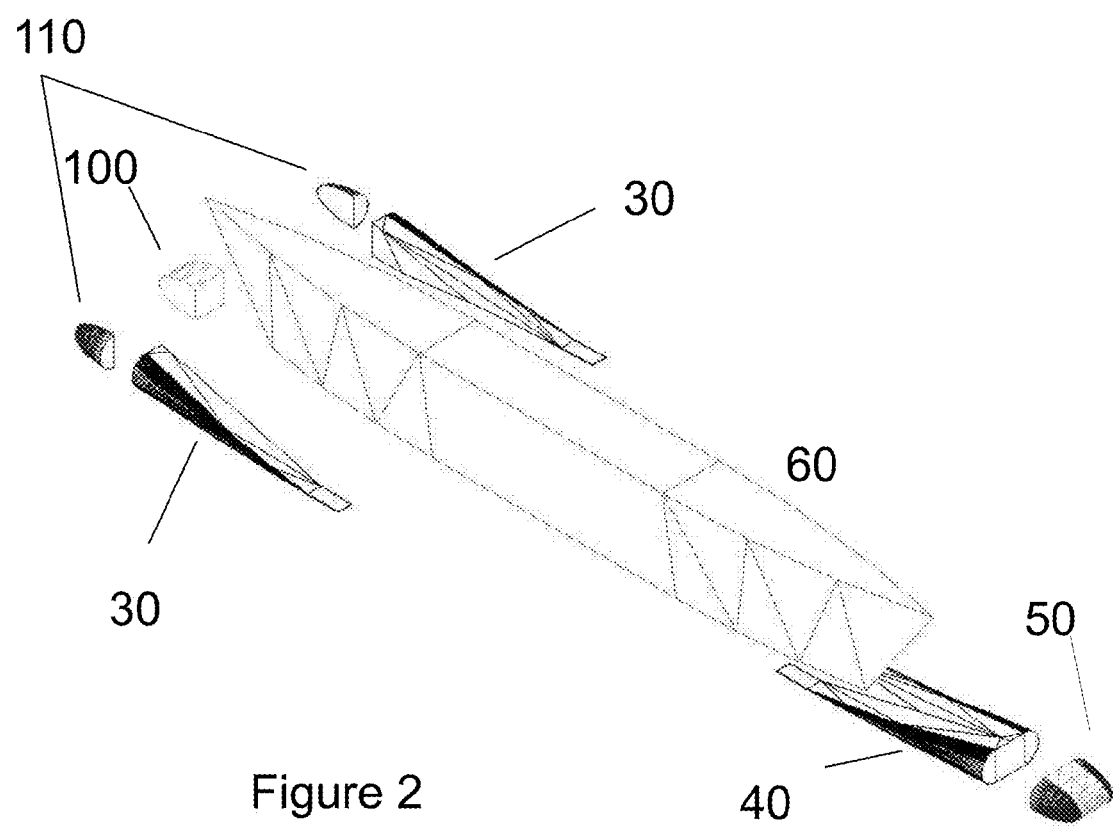
FIG. 2 is an isometric view of the base hull with the bow and stern shapes and nose and tail offset for clarity, with one end fully segmented.
Figure 3:
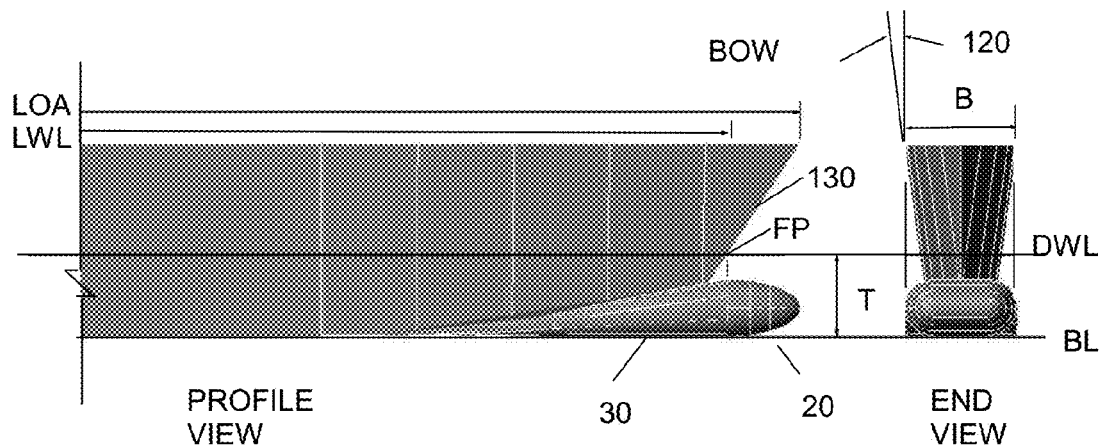
FIG. 3 is a profile and end view of the hull showing key dimensions and reference attributes.
Figure 4:
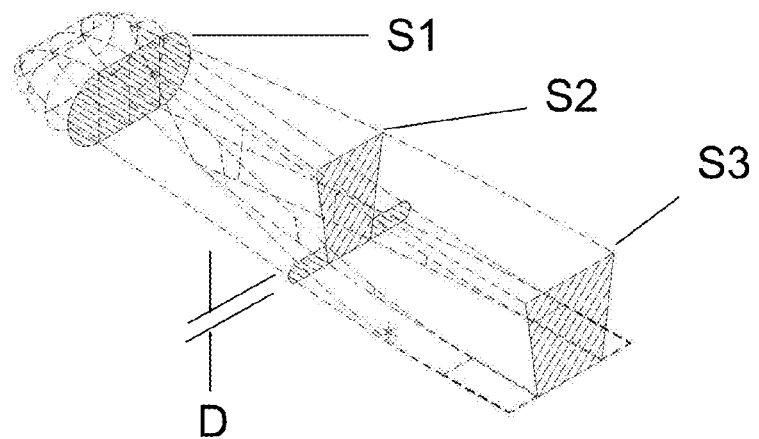
FIG. 4 is an isometric of the bow section phantom up to the design waterline from a stern view with key cross sections hatched.
Figure 5:
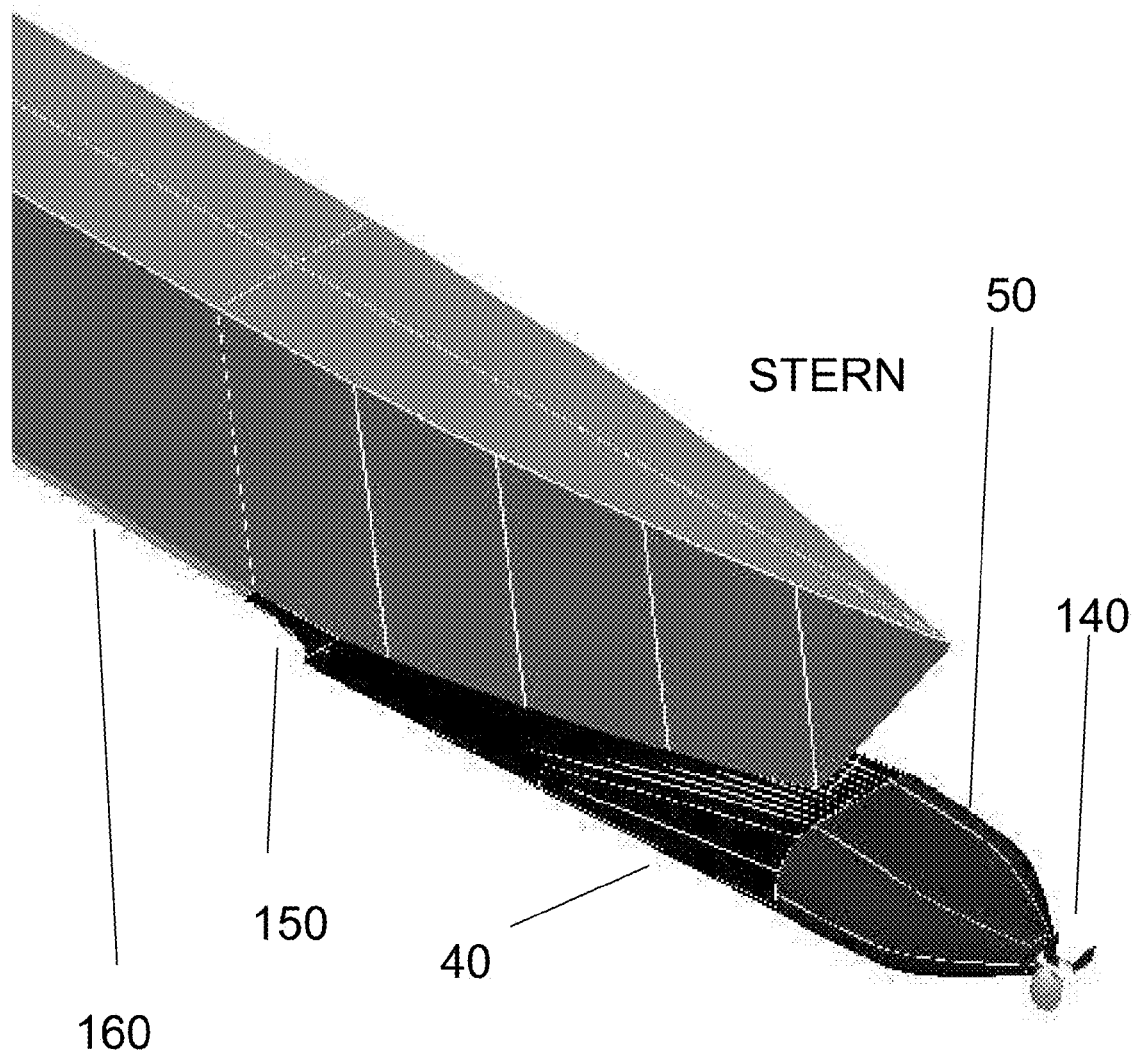
FIG. 5 is a bow isometric view of an embodiment where the tail cone is lofted to interface with a propeller and the thin sections of the bow and stern shapes have been cut to reduce wetted surface area and then extruded along the hull chine to form a bilge keel.

A novel hull 10 is described that improves the performance of the vessel in the marine environment. Said hull 10 incorporates a laterally oriented bow nose 20 followed by a bow shape 30, a stern shape 40, and a tail 50. Said bow shape 30 and stern shape 40 are either as an attachment to or an integral part of said base hull 60. The base hull 60 consists of a bow section 70, stern section 90 and mid-section 80 that all have an equal side flare angle 120. Said flare angle 120 provides reserve buoyancy above the design waterline (DWL) and allows, in the preferred embodiment, an underwater spatial volume for placement of hull shapes along the baseline (BL) external to said base hull 60 while internal to the bounding envelop of length at the waterline (LWL), beam (B) and draft (T). Said bow section 70 and said stern section 90 consist of segments of a cone and are of single curvature and are therefore developable surfaces. Variation in the cone diameter varies the length of said bow section 70 and said stern section 90, shown here as symmetrical. Said mid-section 80 consists of an extruded trapezoidal cross section S3. Said flare angle 120 results in a bow stem line 130 and stern stem line that rake forward and aft, respectively. The rake angle of said bow stem 130 allows the underwater cross sections of said base hull 60 to increase from zero at the forward perpendicular (FP) to a maximum entering the constant cross sections of the said hull mid-section 80. In naval architecture terminology, the forward and aft perpendiculars are located where said bow stem line 130 and stern stem line cross the DWL. In the preferred embodiment, a similar relationship is utilized in the aft section.

In the preferred embodiment, said bow shape 30 longitudinally initiates at the FP at a submerged depth for the centroid of the cross sectional area S1 to be approximately equal to 75% of T. Said bow shape 30 has an athwartships oriented geometry that substantially spans B at all sections. The shape cross sections geometrically consist of semi-circular capped rectangles whose area is adjusted by varying the dimension of the semi-circle diameter (D), which is also the height of the rectangle. At the FP, where the submerged cross sectional area of said base hull 60 is zero, the said cross sectional area S1 equals S3. Proceeding aft, D is adjusted such that when the cross sectional area of said bow shape 30 is combined with the corresponding cross sectional area of said base hull 60, as illustrated is cross section S2, that the cross sectional area substantially equals that of said S3 of mid-section 80. The contribution to cross sectional area due to said bow shape 30 is reduced to zero approaching said mid-section 80, or in the preferred embodiment, to a minimal cross sectional area of a plate 150.

This same geometric relationship is substantially mirrored in said stern shape 40 to the aft perpendicular. In this manner the cross sectional area of said vessel hull 10 remains substantially constant between the forward and aft perpendiculars. Said bow nose 20 and said stern tail 50 are of advantageous hydrodynamic shape and cap off this underwater geometry. In the preferred embodiment, where propulsion can be provided by external propulsion pods, a keel mounted thruster or other means, said bow nose 20 and stern tail 50 are symmetric and consist of an extruded elliptic center section 100 and ellipsoid quadrants 110 interfacing to the rectangular and semi-circular caps of said bow shape 30 and stern shape 40. In this manner the said bow nose 20 parts the water and said tail 50 closes the flow at a depth substantially below the DWL and within the overall length (LOA) of the base hull 60. It is common knowledge in the field of hydrodynamics that, such as in the case of a submarine at speed, the flow about a body at greater depth reduces wavemaking imparted to the air-water interface.

The horizontal projected area of said bow shape 30, said stern shape 40, said bow nose 20, and said stern tail 50 in aggregate is advantageous to creating viscous and eddy making damping to reduce vertical motions resulting from heave and roll of said hull 10 and thereby reduces the amplitude of vessel motions for improved seakindliness.

In an embodiment, the stern tail 50 is lofted from the cross sectional area of the stern shape 40 aft to that of a circular cross section for interfacing with a propeller 140. The leading edge of stern shape 40 is cut to form an elliptic leading edge 150 to interface to a bilge keel plate 160 along the port and starboard chines of said mid-section 80 of the base hull 60. Said bilge keel plate 160 and trailing edge of said bow shape 30 and said leading edge 150 of said stern shape 40 exhibits the properties of a bilge keel for viscous damping of motions while also reducing surface area to reduce viscous resistance of said hull 10.

REFERENCE NUMERALS

10 hull form
20 bow nose
30 bow shape
40 stern shape
50 stern tail
60 base hull
70 base hull bow section
80 base hull mid-section
90 base hull stern section
100 bow nose elliptic extrusion
110 bow nose ellipsoidal quadrant
120 hull side flare angle
130 bow stem
140 propeller
150 stern shape elliptic leading edge plate
160 bilge keel plate
S1 maximum shape section area at perpendiculars
S2 cross sectional area at location between perpendicular and mid-section
S3 maximum shape section area in base hull mid-section

The invention claimed is:

1. A hull comprising:
a base structure of conic bow and stern segments and an extruded middle segment all with constant side flare angle below the design waterline and of planar keel, with
shapes emanating from said bow and stern conic segments, with
said shapes consisting substantially of semi-circular capped, rectangular cross sections spanning the full beam with bottom edges aligned along said planar keel between the forward and aft perpendiculars, with
said cross sections varied in height so as to maintain a substantially constant projected area to flow below said design waterline and above said planar keel, while
said shapes reduce to horizontal edges at transition to said extruded middle segment where said base structure is of maximum and constant cross sectional area, with
a nose and tail capping said shapes and completing said hull,
whereby, said constant projected area to flow minimizes flow disturbance and thereby reduces wavemaking resistance and wake, and
whereby, said horizontal edges increases hydrodynamic damping with vertical motion thereby reducing said hull motion and added resistance in a seaway.

* * * * *